(12) United States Patent
DeBenedictis et al.

(10) Patent No.: US 9,473,922 B2
(45) Date of Patent: Oct. 18, 2016

(54) HYBRID LIABILITY MODEL

(71) Applicants: Christopher J. DeBenedictis, Branford, CT (US); Jeremy J. Hicks, Austin, TX (US)

(72) Inventors: Christopher J. DeBenedictis, Branford, CT (US); Jeremy J. Hicks, Austin, TX (US)

(73) Assignee: Tangoe, Inc., Orange, CT (US)

( * ) Notice: Subject to any disclaimer, the term of this patent is extended or adjusted under 35 U.S.C. 154(b) by 0 days.

(21) Appl. No.: 13/856,986

(22) Filed: Apr. 4, 2013

(65) Prior Publication Data

US 2013/0267198 A1    Oct. 10, 2013

Related U.S. Application Data

(60) Provisional application No. 61/622,360, filed on Apr. 10, 2012.

(51) Int. Cl.
*H04W 4/26* (2009.01)
*H04M 15/00* (2006.01)
*H04W 4/24* (2009.01)

(52) U.S. Cl.
CPC ............. *H04W 4/26* (2013.01); *H04M 15/09* (2013.01); *H04M 15/43* (2013.01); *H04M 15/44* (2013.01); *H04M 15/8033* (2013.01); *H04W 4/24* (2013.01)

(58) Field of Classification Search
CPC .......... G06F 17/60; H04M 15/00; H04J 3/14
See application file for complete search history.

(56) References Cited

U.S. PATENT DOCUMENTS

| | | | | |
|---|---|---|---|---|
| 6,925,160 B1* | 8/2005 | Stevens | .................. | G06Q 30/04 379/114.03 |
| 2002/0042715 A1* | 4/2002 | Kelley | ................... | H04L 12/10 455/406 |
| 2002/0120540 A1 | 8/2002 | Kende et al. | | |
| 2005/0027625 A1* | 2/2005 | Doyle | ..................... | G06Q 30/04 705/34 |
| 2005/0234822 A1* | 10/2005 | VanFleet | ................ | G06Q 20/02 705/44 |
| 2006/0019630 A1 | 1/2006 | Sposato et al. | | |
| 2008/0071629 A1 | 3/2008 | Benson et al. | | |
| 2008/0298466 A1* | 12/2008 | Liu | ........................... | 375/240.24 |
| 2009/0298466 A1* | 12/2009 | Guo | ........................ | H04L 12/14 455/408 |

FOREIGN PATENT DOCUMENTS

| WO | WO/03/060665 | * | 7/2003 | |
| WO | 2008080139 A1 | | 7/2008 | |
| WO | WO/2008/080139 | * | 7/2008 | ................ H04J 3/14 |
| WO | WO2008080139 | * | 7/2008 | ................ H04J 3/14 |

OTHER PUBLICATIONS

International Search Report and Written Opinion of the International Searching Authority Application No. PCT/US2013/0357753 Completed: Jun. 6, 2013; Mailing Date: Jun. 28, 2013 9 pages.

* cited by examiner

*Primary Examiner* — Myron K Wyche
(74) *Attorney, Agent, or Firm* — Stonge Syeward Johston and Reens LLC (57) ABSTRACT

A system and method for setting a billing allocation between a user and a company allowing the costs for personal and work use of a mobile device during a period to be allocated as desired. The system and method further provides for allocation of costs associated with obtaining a new mobile device. The billing allocation model provides maximum flexibility to allow a user to obtain the mobile device desired, while still allowing the user to take advantage of a company's preferred corporate rates and discounts and allowing a company to maintain control of mobile device costs relating to purchase and use of the mobile device.

18 Claims, 4 Drawing Sheets

HYBRID LIABILITY MODEL

FIELD OF THE INVENTION

A hybrid bill loading and cost allocation system and method that allows for the blending of individual liability with corporate liability in the acquisition, setup, billing, personal use identification, and cost reimbursement of mobile devices.

BACKGROUND OF THE INVENTION

The use of mobile devices for telephone, email, text messaging and data transfer continues to expand in the business environment. The proliferation of mobile devices has provided significant advantages to businesses through greater mobility and flexibility. While corporate pricing models and discounts typically lower than an individual would have to pay for the same plan, the cost involved with providing mobile devices and the expenses involved with the service plans for such devices can be significant.

One common business model has been for the company to purchase a mobile device(s) and accompanying service plan and distribute the mobile device(s) to select employees. The company pays for the mobile device and service plan, and the employee uses the device for work. As mobile devices have become more and more diverse offering a greater number of features, individuals have become increasingly reliant on mobile computing.

This has resulted in many individuals having to keep track of multiple mobile devices (i.e., one for work and one for personal). Beyond the challenge of keeping track of multiple different devices (and different mobile device chargers), having different devices can lead to additional work for the individual. For example, personal and work contacts have to be separated and syncing contact with an computer can be much more complicated; invariably there will be mixing of work and personal between the two devices; and trying to keep multiple devices charged can be challenging especially there is only one outlet for charging a device in the individual's vehicle to name just a few.

Accordingly, many companies have allowed employees to use their work mobile devices for personal matters, thereby negating the need to have and maintain two mobile devices. However, this has created additional challenges. For example, employees may heavily use of data features on their work mobile device for personal matters. This is especially so with broadband connections were users can download giga-bytes of data in a very short time (e.g., downloading music files, streaming video, downloading applications, etc.). Some individuals will make only modest use of their mobile device. However, with many individuals engaging in heavy data usage, the data allotment for the billing cycle for the company can quickly be reached. Overage charges can exceed the cost of the entire telecom plan for the billing cycle.

Another problem faced by companies that allow their employees to use the company provided mobile device for personal use, is that employees do not all use their mobile devices in the same way. For example, some text message heavily, while others need the ability to download and view documents, still others stream videos resulting in heavy data usage. There are quite a few different mobile devices, each with particular benefits and drawbacks. Accordingly, some companies have simply allotted a set stipend to employees in order to purchase the mobile device of the employees choosing to use for both work and personal, also known as Bring Your Own Device (BYOD). A problem arises though, when a company has to integrate a relatively large number of diverse devices, to accommodate the diverse use (both work and personal) of its employees, and determine how to control costs associated with an employee's personal use of the mobile device(s), also known as the employee's individual liability.

SUMMARY OF THE INVENTION

What is desired then, is a system and method that can allocate expenses for mobile device usage where a user is utilizing a mobile device for both work and personal usage.

It is also desired to provide a system and method that can allocate expenses for the acquisition of a mobile device that will be used for both work and personal usage.

It is further desired to provide a system and method that can facilitate the setup process for allocating expenses for mobile device usage where a user is utilizing a mobile device for both work and personal usage.

It is still further desired to provide a system and method that can automatically identify personal mobile phone use where a user is utilizing a mobile device for both work and personal usage.

It is yet further desired to provide a system and method that can automatically allocate billing for personal usage of a mobile device that is utilized for both work and personal usage.

These and other objects are achieved in one embodiment by the provision of a system (Hybrid Liability) that enables customers to retain corporate pricing models and discounts, while essentially transferring payment responsibility to end users for the portion of their personal use. This model represents a cost-effective blend of corporate liability and individual liability.

In one example, a web-based system (or any type of networked system) is provided that allows a user (which may comprise any individual including, for example, an administrator) to login and input personal, billing and mobile device information (in the case of an administrator, the information would be input on behalf of the user). The user/admin may then be presented with a number of various billing allocations. Once the user/admin selects a particular billing allocation, a billing allocation request is submitted for approval/rejection. The approval/rejection may be an automated process determined based on select criteria, or may include a manual approval/rejection process by, for example, an administrator. If the request is rejected, the user may then attempt to set up an alternative billing allocation. If the request is accepted, then the system is configured based on the selected billing allocation.

While the system has been discussed in connection with setting of a billing allocation, it is contemplated that an individual may further request to obtain a mobile device through the company. The company may provide a budget or stipend for the employee up to a set dollar amount, beyond which, the employee will be responsible for the cost. If the cost is below the budget, the system can process the order and contact a third party mobile device provider to fulfill the order and set up the billing allocation as previously discussed. If the selected mobile device exceeds the budget or stipend, then the system can be set up to automatically charge the excess to the employee. This charge can be directly to the employee's credit card, or to a personal expense account, or may be automatically charged to the employee as a payroll deduction, etc. In any event, the cost to the company for obtaining the mobile device is capped at the budget for the particular employee.

For this application the following terms and definitions shall apply:

"IL" refers to an Individual Liable environment, where employees must pay for both devices and ongoing plan costs. In this environment, the device is owned a consumer.

"CL" refers to a Corporate Liable environment, where enterprises must pay for both devices and ongoing plan costs. In this model, the device is enterprise owned equipment provided to the employee.

"HL" refers to Hybrid Liable, and is a blend of CL and IL environments, where all or some of the device costs and/or ongoing plan costs are charged to the end user.

The term "data" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

The term "billing system" refers to a bill loading and cost allocation system that allows for allocation of liabilities.

The system utilizing the HL model, allows for costs to be shared between the company and the individual. For example, costs relating to personal telecom/data charges can be allocated to the user and automatically charged to the user's credit card. Alternatively, the costs could be assigned as a personal charge to the user and could be provided as part of an AP/GL file for payroll deduction or through direct integration with payroll systems for payroll deduction.

The allocation of charges may be based, for example, according to any of the following:

1. As a percentage of all charges: for example, 70% paid by company, 30% paid by employee.
2. As notated line items from a bill: for example, charges X, Y, Z paid by company, charges A, B, C paid by employee.
3. As a percentage of notated line items from a bill: for example, charge X paid 70% by company, 30% by employee; charge Y paid 50% by company, 50% by employee.
4. Derived by marking individual call, text, and/or data detail items as company paid or employee paid and calculating appropriate charges.
5. By assuming all charges are employee's responsibility.
6. By assuming all charges are company responsibility.
7. Based on a date, for example, some or all charges incurred after a specific date would be the responsibility of the enterprise, but prior to that date is the responsibility of the employee.

In one example, a method for allocating costs of a mobile telecommunications plan between a user and an entity is provided comprising the steps of saving user information on a storage accessible by a server, and presenting a plurality of billing allocations to the user accessing the server. The method further comprises the steps of transmitting a selection of one the plurality of billing allocations to the server, and generating an approval or rejection of the selected one of the plurality of billing allocations. The method is provided such that if the selected billing allocation is accepted, configuring the server to allocate billing between the user and the entity based on the selected billing allocation.

In another example, a system for allocating costs of a mobile telecommunications plan between a user and an entity is provided comprising a server, having a network connection and a storage, where user information is saved on the storage, and software executing on the server to present a plurality of billing allocations to the user. The system further comprises software executing on the server to receive a selection of one the plurality of billing allocations, and software executing on the server to generate an approval or rejection of the selected one of the plurality of billing allocations. The system is provided such that if the selected billing allocation is accepted, software executes on the server to configure the server to allocate billing between the user and the entity based on the selected billing allocation.

In still another example, a method for allocating costs of a mobile telecommunications plan between a user and an entity is provided comprising the steps of saving user information on a storage accessible by a server, and presenting a plurality of billing allocations to the user accessing the server selected from the group consisting of: a percentage of all charges attributed to the user's mobile device during a period; as notated line items from a bill; as a percentage of notated line items from a bill; and combinations thereof. The method further comprises the steps of transmitting a selection of one the plurality of billing allocations to the server and generating an approval or rejection of the selected one of the plurality of billing allocations. The system is provided such that if the selected billing allocation is accepted, configuring the server to allocate billing between the user and the entity based on the selected billing allocation.

Other objects of the invention and its particular features and advantages will become more apparent from consideration of the following drawings.

DETAILED DESCRIPTION OF THE INVENTION

Referring now to the drawings, wherein like reference numerals designate corresponding structure throughout the views.

Figure 1:
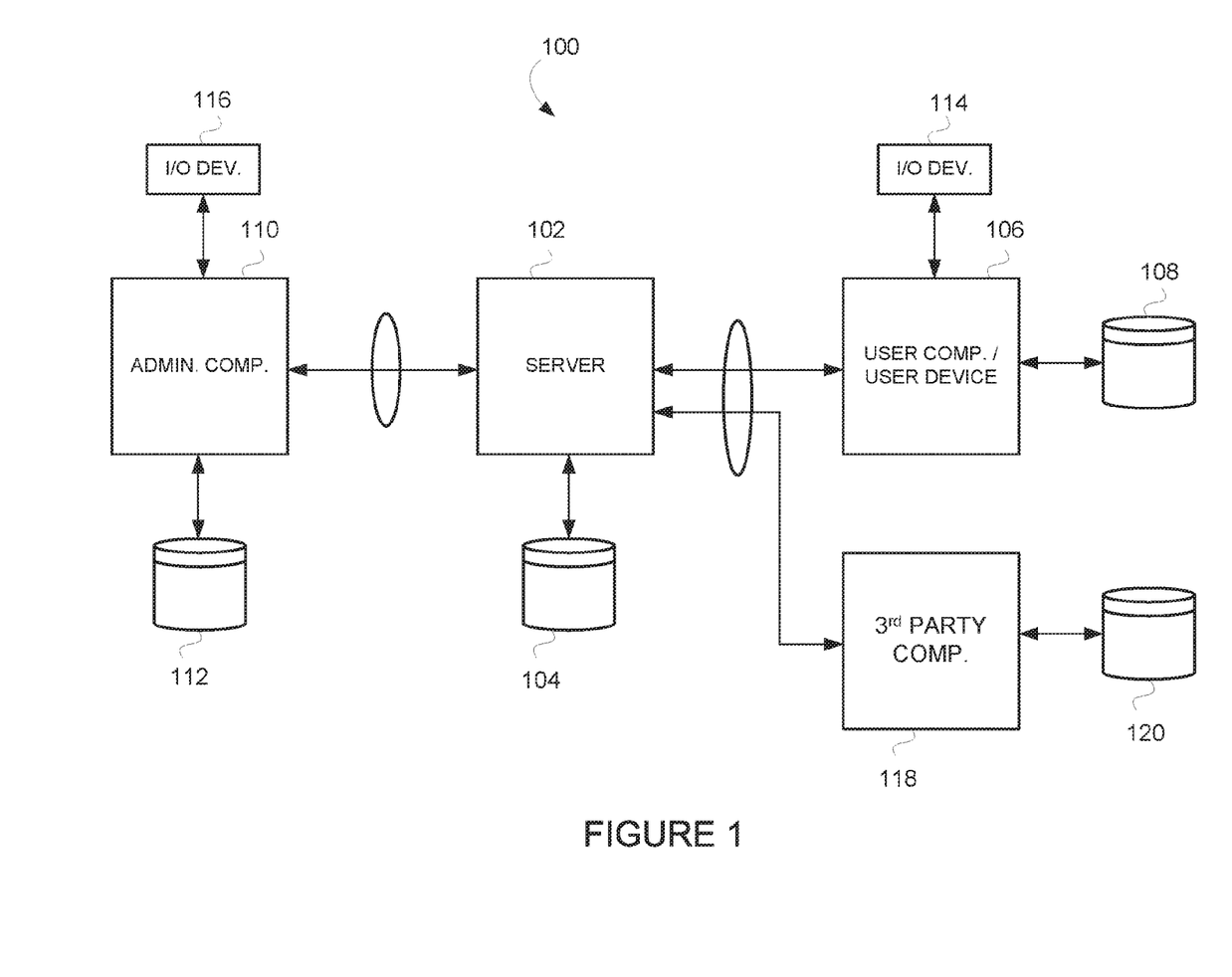
FIG. 1 is a block diagram of an example of the present invention.

FIG. 1 is a block diagram depicting system 100 including a server 102 with storage 104. Coupled to server 102 is user computer/user device 106 via a network connection and including storage 108. It should be noted that the server and user computer may comprise virtually any type of computer that may be used to transmit and receive data/information whether wired or wireless. In one embodiment, the user computer/user device may comprise a user's mobile device.

Also coupled to server 102 via a network connection is administrator computer 110 including storage 112. User computer/user device 106 and administrator computer 110 are each provided with input/output device(s) 114, 116 respectively, which may comprise virtually any type of interface allowing a user or administrator to input and receive data from the respective computer/device.

Finally, a third party computer 118 including storage 120 is depicted in FIG. 1. Third party computer 118 may, in one advantageous embodiment, be coupled to server 102 via a network connection.

A user can access server 102 via user computer/user device 106 to provide the system 100 with user information. The user information can include an identity of the user and billing information. For example, the user could provide a credit card number or a bank account number associated with the user for direct payment, which can be used as a payment means. Alternatively, a user could request that any charges be charged to a personal account or be paid as a payroll deduction, or an electronic funds transfer, etc. Additionally, it is understood that partial or whole payment(s) of a carrier bill to a carrier for an allocation of IL could be selected. There are many different payment options and allocations available and the preceding examples are presented to illustrate and explain the present invention and should not be taken as limiting in any regard.

In one example, it is contemplated that a user may access the server for a company or organization (e.g. via a webpage; or via a network connection—tablet or smart phone app, VRU, etc.) to set up a billing allocation for their mobile device. It should be noted that while the application refers to a "company" or "organization", the entity that is sharing the billing allocation can be virtually any entity including, for example, another individual, group of individual(s), etc. The user can log on to server 102 and browse available billing allocations that allocate costs for a telecommunications plan for the user's mobile device. Thus user can select one of the billing allocation options, which is submitted to server 102. In one embodiment, an administrator via administrator computer 110 can approve or disapprove of the billing allocation request.

In another embodiment, a user can request a new mobile device and a billing allocation for that new mobile device. It is understood that the company may provide a stipend to the user toward the purchase of the mobile device. The user can submit the type of mobile device to the server 102 along with the desired billing allocation, which can then be approved or disapproved. If the cost for the mobile device exceeds the stipend provided to the user, the additional cost can be borne by the user.

If the request for a new mobile device is approved, an order may be sent to a third party computer 118, which may comprise a mobile device vendor. The mobile device can then be sent to any of, the user, the administrator or the company.

Figure 2:
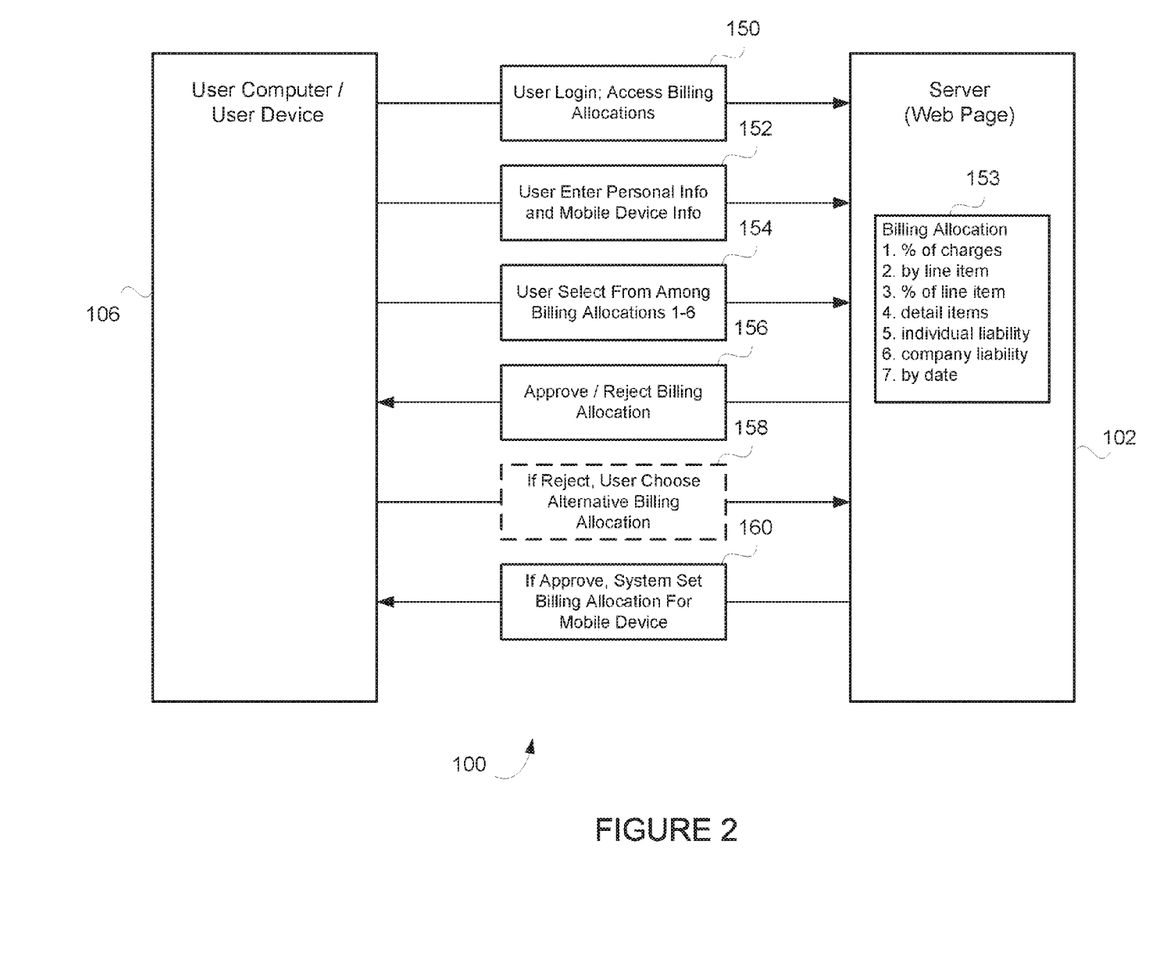
FIG. 2 is a block diagram according to FIG. 1.
Figure 3:
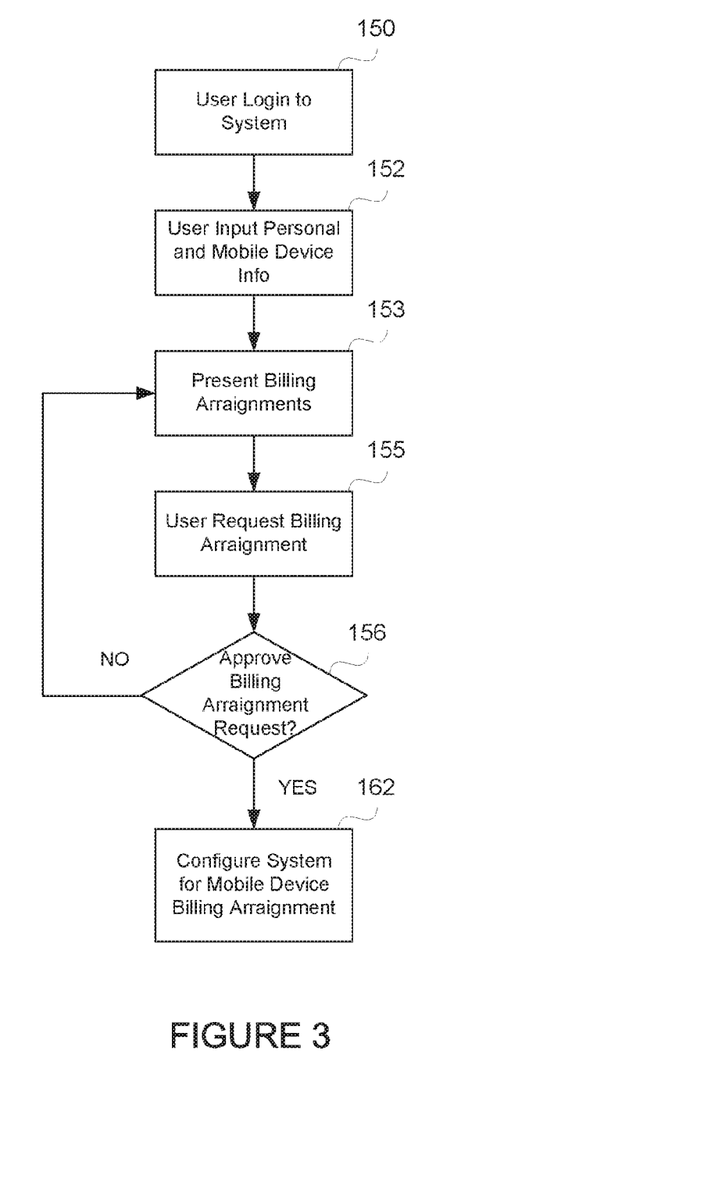
FIG. 3 is a flow diagram according to FIG. 1.

Turning now to FIGS. 2-4, FIG. 2 is a block diagram that illustrates the process of setting the billing allocation for a mobile device and FIG. 3 is a corresponding flow diagram. A user accesses server 102 with user computer 106 (user device). The user can log in to the server (or set up an account) to access various billing allocations at 150. If the user has not already done so, the user can input personal information and mobile device information at 152. In this embodiment, it is presumed that the user already has a mobile device and is setting up a billing allocation. Accordingly, the user will need to enter information about the mobile device and the current mobile device plan. Alternatively, the user may only enter information about the mobile device and will be using the mobile device with the company's telecommunications plan. Still further, the company could be providing a mobile device to the user, and the user is only setting up a billing allocation. Again, there are many differing arrangements and the present embodiment is provided only to explain the process of selecting and setting a billing allocation and is not meant to be otherwise limiting.

The user enters personal information into the system, which will include billing information. It is understood that the user may provide various billing information as previously discussed and can select and order in which the billing is processes. For example, the user may select a payroll deduction as a first payment choice, however, the company may further require that the user input credit card information as a secondary payment option. Alternatively, the user may input bank account information and list that as the primary payment option, however, in the event that payment cannot be received from the bank account for any reason, the company could revert to the secondary option (credit card) or third option (payroll deduction). In any event, the payment options will be selectable by the user.

The user may then be presented with various billing allocations for the mobile device telecommunications plan at 153 (FIG. 3). As seen in FIG. 2, various billing allocations could include, but are not limited to:

1. A percentage of charges. In this allocation, the user and the company are each allocated a percentage of all the charges that occur during a period (e.g., a billing cycle): for example, 70% paid by company, 30% paid by user/employee.

2. Notated line items from a bill. In this allocation, either the company or the employee pays for notated line items on the bill for the period. For example, charges X, Y, Z are to be paid for by the company, charges A, B, C are to be paid for by the user/employee. Alternatively, chargers X, Y, Z are to be paid for by the company and all remaining charges are to be paid for by the user/employee.

3. A percentage of notated line items from a bill. This allocation is basically a hybrid of —. and 2. above. For example, a notated charge X is to be paid 70% by the company and 30% by the user/employee; while charge Y is to be paid 50% by the company, and 50% by the user/employee.

4. Marked detail Items. Derived by marking individual call, text, and/or data detail items as company paid or employee paid and calculating appropriate charges.

5. Individual liability. By assuming all charges are employee's responsibility.

6. Company liability. By assuming all charges are company responsibility.

7. Based on a date. Some or all charges incurred after a specific date would be the responsibility of the enterprise, but prior to that date is the responsibility of the employee.

It is contemplated that any combination of the above-listed billing allocations could also be utilized. Further, it is contemplated that billing allocation could be assigned through integration with a Travel and Expense (T+E) system, passing all line items to T+E system for charge marking.

The user then selects the particular billing allocation 154 desired, or can select a hybrid billing allocation of any of the above-listed billing allocations. A billing allocation request is then submitted to the system 155 for approval or rejection (FIG. 3). The particular billing allocation is then approved or rejected 156. The approval process can be a fully automated process (e.g., software executing on the server 102) or could be submitted to an administrator for approval or rejection. Alternatively, the approval process could be a hybrid with an administrator approving or rejecting the billing allocation only under certain circumstances (e.g., a hybrid billing allocation) and the software handling all other billing allocation requests. It is understood that the administrator could set a different cost allocation model than that supplied by the user. Alternatively, the administrative computer 110 could have software executing thereon for automatic review of the submitted cost allocation to automatically approve/disapprove/modify the billing allocation. It is contemplated that many different permutations are possible and the foregoing is presented only to explain certain embodiments of the invention and is not intended to be limiting.

If the submitted billing allocation by the user is rejected 158, the user has the option to select an alternative billing allocation. If the submitted billing allocation by the user is approved 160, the system then sets or configures the billing allocation for the mobile device 162 with the corresponding personal information and billing information as previously discussed. Additionally, if the mobile device is provided by the user, the mobile device is configured and/or provisioned to function with the telecommunications plan provided by the company. This step could be performed by the company or by a third party, etc. In any event, the mobile device is ready to be used by the user, who is able to take advantage of the company's telecommunications plan billing rates and discounts, however, the billing for work and personal mobile device usage will be allocated between the user and company as previously defined. While the Figures depict certain preferred embodiments, they are not meant to be limiting. For example, it is possible that the company may provide a monthly stipend or budget for the user such that, the monthly stipend or budget is automatically deducted from any amount to be billed to the user. This stipend or budget could be rolled over (or not) from month to month in the event the user fails to use the entire amount in a billing period; or the stipend or budget could be yearly amount. Again, there are many different billing allocations that could be automated and utilized.

In this manner, the payment of ongoing monthly expenses relating to the use of the mobile device may be flexibly set by the user/administrator or organization to fulfill the need depending on the application and employment arrangement/agreement. In other words, a versatile system and method is provided that allows for virtually unlimited allocation of billing for the use of a mobile device.

Figure 4:
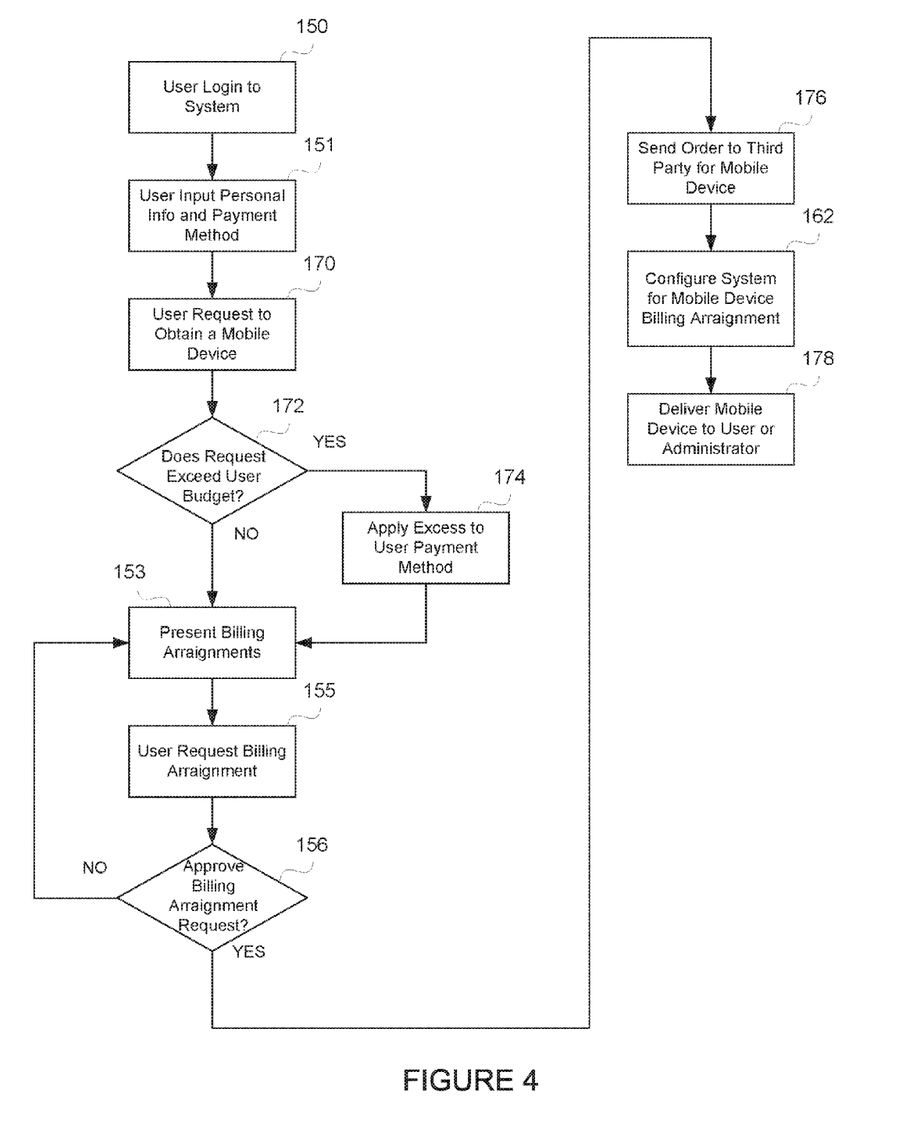
FIG. 4 is a flow diagram according to FIG. 1.

Turning now to FIG. 4, an alternative embodiment is described in which a user may request the company obtain a mobile device for the user. In this embodiment, a user may log in to the system at 150 and then input personal information and payment method as previously described in connection with FIGS. 2 and 3. At this point, the user may then submit a request to obtain a particular type of mobile device 151. The user may select from among various mobile devices provided on a list, or the system may accommodate allowing the user to simply input the mobile device type and description 170.

It is understood that the company may further provide a budget or stipend to the user for the purchase of the mobile device. In this event, the system will determine whether the requested mobile device exceeds the budget or stipend 172; and if so, the system can then apply the excess cost to the user payment method 174 as previously defined. Alternatively, the company could require the user to bear the entire cost of purchasing the requested mobile device; or the company could pay the entire amount depending upon the employment agreement. Still further, the company could provide a list of mobile devices they would provide free of charge and only require the user to pay for mobile devices not on the list. Again, it is contemplated that many different billing allocations are possible and the foregoing are merely provided as examples and are not intended to be limiting. While not depicted in the Figures, it is understood that an approval/rejection process for the mobile device could be utilized that is similar to that described in connection with the billing allocation approval/rejection process. In this manner, the acquisition of and payment the mobile device may be flexibly set by the user/administrator or organization to fulfill the need depending on the application and employment arrangement/agreement.

The billing allocation steps provided in FIG. 4 are similar to those described in connection with FIGS. 2 and 3 and will not be re-described here.

Once the mobile device request and the billing allocation requests are approved and completed, the system can then send an order to a third party to provide the mobile device 176. The third party can be any entity that provides mobile devices; and may include the steps of setting up and provisioning the mobile device to function with the company's telecommunications plan. In a final step, the configured and/or provisioned mobile device is delivered 178, which could be directly to the user or to an administrator (for provisioning).

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method for automatically allocating costs of a mobile telecommunications plan between a user and an entity via software executing on a computer comprising the steps of:

saving user information on a storage accessible by the computer;

presenting a plurality of billing schemes to the user accessing the computer with a user computer;

said user selecting one of the plurality of billing schemes via the user computer, the selected billing scheme comprising a ruleset for determining future billing allocations between the user and the entity for mobile telecommunications use by a mobile device;

transmitting the selected billing scheme to the computer; and said software analyzing the selected billing scheme and generating an approval or rejection of the selected billing scheme based, at least in part, on data received from an administration computer;

wherein, if the selected billing scheme is accepted, said software configures the computer based on the ruleset of the selected billing scheme to allocate billing between the user and the entity.

2. The method of claim 1, wherein, if the selected one of the plurality of billing schemes is rejected, the method further comprising the steps of:
said user selecting a second one of the plurality of billing schemes via the user computer;
transmitting a second selection of one of the plurality of billing schemes to the computer;
wherein, if the second selected billing scheme is accepted, said software configures the computer based on the ruleset of the selected billing scheme to allocate billing between the user and the entity.

3. The method of claim 2, wherein the second selected billing scheme is different than the selected billing scheme.

4. The method of claim 1, wherein the plurality of billing schemes is selected from the group consisting of: a percentage of all charges attributed to the user's mobile device during a period; as notated line items from a bill; as a percentage of notated line items from a bill; and combinations thereof.

5. The method of claim 4, wherein the period comprises a billing cycle.

6. The method of claim 1, wherein the user is an employee of the entity.

7. The method of claim 1, wherein when the selected billing scheme includes a requirement that the user pay at least a portion of a bill issued for a period, the method further comprises the steps of:
automatically paying the portion of a bill allocated to the user by at least one of the following schemes: charging a user credit card, charging a user account, performing a payroll deduction, and combinations thereof.

8. The method of claim 1, further comprising the steps of:
transmitting a request for the procurement of a mobile telecommunications device to the computer;
determining if a cost for procuring the mobile telecommunications device exceeds a threshold limit;
wherein, if the cost for procuring the mobile telecommunications device does not exceed a threshold limit, transmitting an order to a third party to fulfill the request.

9. The method of claim 8, wherein, if the cost for procuring the mobile telecommunications device does exceed a threshold limit, the method further comprising the steps of:
charging the user the cost for procuring the mobile telecommunications device that exceeds the threshold limit; and
wherein, if the cost for procuring the mobile telecommunications device that exceeds the threshold limit is paid by the user, transmitting an order to a third party to fulfill the request.

10. The method of claim 9, wherein the cost for procuring the mobile telecommunications device that exceeds the threshold limit is paid by at least one of the following schemes: automatically charging a user credit card, automatically charging a user account, automatically performing a payroll deduction, and combinations thereof.

11. A system for automatically allocating costs of a mobile telecommunications plan between a user and an entity comprising:
a server, having a network connection and a storage, where user information is saved on said storage;
software executing on said server to present a plurality of billing schemes to the user;
software executing on said server to receive a selection of one the plurality of billing schemes, the selected billing scheme comprising a ruleset for determining future billing allocations between the user and the entity for mobile telecommunications use by a mobile device; and
software executing on said server to analyze the selected billing scheme and generate an approval or rejection of the selected one of the plurality of billing schemes based, at least in part, on data received from an administration computer;
wherein, if the selected billing scheme is accepted, software executes on said server to configure the server to allocate billing between the user and the entity based on the selected billing scheme.

12. The system of claim 11, wherein if the selected one of the plurality of billing schemes is rejected, the system further comprises:
software executing on said server receive a second selection of one the plurality of billing schemes;
wherein, if the second selected billing scheme is accepted, said software configures the server based on the ruleset of the selected billing scheme to allocate billing between the user and the entity.

13. The system of claim 11, wherein the plurality of billing schemes is selected from the group consisting of: a percentage of all charges attributed to the user's mobile device during a period; as a percentage of notated line items from a bill; and combinations thereof.

14. The system of claim 13, wherein the period comprises a billing cycle.

15. The system of claim 11, further comprising:
software executing on said server to receive a mobile telecommunications device procurement request;
software executing on said server to determine if a cost for procuring a mobile telecommunications device identified in mobile telecommunications device procurement request exceeds a threshold limit;
wherein, if the cost for procuring the mobile telecommunications device does not exceed a threshold limit, software executes on said server to transmit an order to a third party to fulfill the request.

16. The system according to claim 11 wherein the user accesses said server via a web page interface.

17. A method for automatically allocating costs of a mobile telecommunications plan between a user and an entity via software executing on a server comprising the steps of:
saving user information on a storage accessible by a server;
presenting a plurality of billing schemes to the user accessing the server with a user computer selected from the group consisting of: a percentage of all charges attributed to the user's mobile device during a period; as a percentage of notated line items from a bill; and combinations thereof;
transmitting a selection of one the plurality of billing schemes to the server, the selected billing scheme comprising a ruleset for determining future billing allocations between the user and the entity for mobile telecommunications use by a mobile device; and
said software analyzing the selected billing scheme and generating an approval or rejection of the selected billing scheme based, at least in part, on data received from an administration computer;
wherein, if the selected billing scheme is accepted, said software configures the server to allocate billing between the user and the entity based on the selected billing scheme.

18. The method of claim 17, wherein when the selected billing scheme includes a requirement that the user pay at least a portion of a bill issued for a period, the method further comprises the steps of:

automatically paying the portion of a bill allocated to the user by at least one of the following schemes: charging a user credit card, charging a user account, performing a payroll deduction, and combinations thereof.

* * * * *